(12) United States Patent
Jung et al.

(10) Patent No.: US 10,484,401 B2
(45) Date of Patent: Nov. 19, 2019

(54) IN-VEHICLE NETWORK ATTACK DETECTION METHOD AND APPARATUS

(71) Applicants: HYUNDAI MOTOR COMPANY, Seoul (KR); KIA MOTORS CORPORATION, Seoul (KR); Ewha University—Industry Collaboration Foundation, Seoul (KR)

(72) Inventors: Ho Jin Jung, Seoul (KR); Hyun Soo Ahn, Seoul (KR); Je Won Kang, Seoul (KR); Min Joo Kang, Seoul (KR)

(73) Assignees: HYUNDAI MOTOR COMPANY, Seoul (KR); KIA MOTORS CORPORATION, Seoul (KR); EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 487 days.

(21) Appl. No.: 15/202,255

(22) Filed: Jul. 5, 2016

(65) Prior Publication Data
US 2017/0126711 A1 May 4, 2017

(30) Foreign Application Priority Data
Oct. 30, 2015 (KR) .................. 10-2015-0151648

(51) Int. Cl.
*G06F 11/00* (2006.01)
*G06F 12/14* (2006.01)
(Continued)

(52) U.S. Cl.
CPC ...... *H04L 63/1416* (2013.01); *B60R 16/0231* (2013.01); *G05B 15/02* (2013.01);
(Continued)

(58) Field of Classification Search
CPC ........ H04W 4/48; H04W 4/046; H04L 67/12; H04L 63/1425; H04L 63/1416;
(Continued)

(56) References Cited

U.S. PATENT DOCUMENTS

| 9,380,070 | B1* | 6/2016 | Cain | H04L 63/1416 |
|---|---|---|---|---|
| 9,843,594 | B1* | 12/2017 | Evans | H04L 63/1425 |
| 2005/0210248 | A1* | 9/2005 | Graveman | G11B 20/1833 |
| | | | | 713/168 |
| 2014/0250530 | A1* | 9/2014 | Moeller | H04W 4/029 |
| | | | | 726/23 |

(Continued)

FOREIGN PATENT DOCUMENTS

| JP | 2004-312083 | 11/2004 |
|---|---|---|
| JP | 2005-244429 A | 9/2005 |

(Continued)

*Primary Examiner* — Trong H Nguyen
(74) *Attorney, Agent, or Firm* — Brinks Gilson & Lione

(57) ABSTRACT

The present disclosure provides a vehicle controller area network (CAN) communication attack detection method and apparatus. The apparatus includes: a learning module, a profiling module, and a detection module. The learning module identifies a CAN identifier (ID) upon receiving a predefined CAN packet and generates learning statistical information expressed as bits with respect to a data field corresponding to the identified CAN ID. The profiling module maintains the learning statistical information received and a precollected attack type, and the detection module extracts a CAN ID and a bit stream of a data field from a real-time input CAN packet. In addition, the detection module configures a neural network by acquiring the learning statistical information from the profiling module, inputs the extracted bit stream to the configured neural network, and determines whether attack is detected, based on an output value of the neural network.

20 Claims, 8 Drawing Sheets

(51) Int. Cl.

| | | |
|---|---|---|
| *G06F 12/16* | (2006.01) | |
| *G08B 23/00* | (2006.01) | |
| *H04L 29/06* | (2006.01) | |
| *B60R 16/023* | (2006.01) | |
| *G05B 15/02* | (2006.01) | |
| *G06N 3/04* | (2006.01) | |
| *G06N 3/08* | (2006.01) | |
| *H04L 29/08* | (2006.01) | |

(52) U.S. Cl.
 CPC ............. *G06N 3/0472* (2013.01); *G06N 3/08* (2013.01); *H04L 67/12* (2013.01)

(58) Field of Classification Search
 CPC ... H04L 63/1408; B60R 16/0231; G06N 3/08; G06N 3/088
 See application file for complete search history.

(56) References Cited

U.S. PATENT DOCUMENTS

| | | | |
|---|---|---|---|
| 2014/0250531 A1* | 9/2014 | Moeller | ................ H04W 4/029 726/23 |
| 2015/0007314 A1 | 1/2015 | Vaughan | |
| 2015/0113638 A1* | 4/2015 | Valasek | ............... H04L 63/1408 726/22 |
| 2015/0271201 A1* | 9/2015 | Ruvio | ................ H04L 63/1408 726/23 |
| 2018/0196941 A1* | 7/2018 | Ruvio | ................... G06F 21/554 |

FOREIGN PATENT DOCUMENTS

| | | |
|---|---|---|
| JP | 2006-295920 A | 10/2006 |
| KR | 10-0738537 B | 7/2007 |
| KR | 10-1446525 B | 10/2014 |
| KR | 10-2015-0007807 A | 1/2015 |

\* cited by examiner

Bit stream of data field (64 bits)

IN-VEHICLE NETWORK ATTACK DETECTION METHOD AND APPARATUS

CROSS-REFERENCE TO RELATED APPLICATION

This application claims the benefit of and priority to Korean Patent Application No. 10-2015-0151648, filed on Oct. 30, 2015, which is hereby incorporated by reference in its entirety.

FIELD

The present disclosure relates to in-vehicle communication security and, more particularly, to a method for detecting attack over an in-vehicle communication network and an apparatus therefor.

BACKGROUND

The statements in this section merely provide background information related to the present disclosure and may not constitute prior art.

Future vehicles are devised to increase user's convenience and driving efficiency by mounting a plurality of electronic controllers (ECUs) linked with various sensors installed at the inside/outside of a vehicle and smartly controlling various functions through communication using an in-vehicle network such as a controller area network (CAN).

Recently, in an Internet of things (IoT) technology field of information communication, studies for employing a smart-car etc. as a platform have been actively conducted.

Moreover, recently, standardization and technical development of vehicle-to-vehicle communication or vehicle-to-infrastructure communication for providing an intelligent traffic network service has been actively carried out.

As such, it is expected that types of hacking on a future smartvehicle will diversify and evolve into a distributed form because communication packets will increase and communications with various external devices will be performed.

However, while resources that can be used in a vehicle are limited, hacking types are diversified and distributed, so that it is not easy to effectively cope with hacking.

Especially, hacking and attacks on security while a vehicle is stopped or driven may have a serious effect on driving safety as well as on privacy of a driver. For example, if an engine of a vehicle is stopped or steering handle/brake is incorrectly operated due to hacking, safety of the driver may be jeopardized.

SUMMARY

The present disclosure provides a method for adaptively detecting attack based on a statistical characteristic of a prelearned CAN packet and an apparatus therefor.

The present disclosure also provides a method for detecting CAN attack, that can adaptively detect attack based on a statistical characteristic of binary data without decoding a CAN communication packet and an apparatus therefor.

According to one form, the present disclosure provides an apparatus for detecting vehicle controller area network (CAN) communication attack. The apparatus includes: a learning module; a profiling module; and a detection module. The learning module is configured to identify a CAN identifier (ID) upon receiving a predefined CAN packet and generate learning statistical information expressed as bits with respect to a data field corresponding to the identified CAN ID. The profiling module is configured to maintain the learning statistical information received from the learning module and a precollected attack type. The detection module is configured to extract a CAN ID and a bit stream of a data field from a real-time input CAN packet, configuring a neural network by acquiring the learning statistical information from the profiling module, inputting the extracted bit stream to the configured neural network, and determining whether attack is detected, based on an output value of the neural network.

The detection module may transmit a corresponding attack CAN packet to the profiling module upon determining that attack is detected according to the output value and the profiling module may update the attack type using the attack CAN packet.

The detection module may sense attack by determining whether the real-time input CAN packet is a CAN packet corresponding to the attack type.

The learning module may extract an interest point based on the learning statistical information expressed as the bits.

The learning module may select at least one partial specific bit stream in the bit stream of the data field as the interest point.

The detection module may input a bit stream corresponding to the selected interest point to the configured neural network.

The interest point may include at least one of a bit stream expressing mode information and a bit stream expressing number information.

The learning module may select the interest point in units of bits based on variation of units of bits in the bit stream of the data field over time.

The variation of units of bits may be calculated by an exclusive-OR operation on data field regions of two consecutive CAN packets.

The predefined CAN packet may include a CAN packet of a normal state and a CAN packet of an abnormal state.

According to another aspect of the present disclosure, provided herein is an apparatus for detecting vehicle controller area network (CAN) communication attack, including a learning module for generating learning statistical information expressed as bits upon receiving a predefined CAN packet, by extracting a bit stream of the predefined CAN packet matching a template region configured in units of fields constituting a CAN data frame, a profiling module for maintaining the generated learning statistical information and a precollected attack type, and a detection module for extracting a bit stream matching the template region from a real-time input CAN packet, configuring a neural network using the generated learning statistical information for the template region, inputting the extracted bit stream to the configured neural network, and determining whether attack is detected, based on an output value of the neural network.

According to another form, provided herein a method for detecting vehicle controller area network (CAN) communication attack, including identifying a CAN identifier (ID) upon receiving a predefined CAN packet and generating and storing learning statistical information expressed as bits with respect to a data field corresponding to the identified CAN ID, extracting a CAN ID and a bit stream of a data field from a real-time input CAN packet, configuring a neural network based on the learning statistical information corresponding to the extracted CAN ID, inputting the extracted bit stream to the configured neural network and determining whether attack is detected, based on an output value of the neural network.

The method may further include maintaining information about a precollected attack type in a predetermined recording region and, if it is determined that attack is detected according to the output value, updating the attack type using the real-time input CAN packet.

The method may further include sensing attack by determining whether the real-time input CAN packet is a CAN packet corresponding to the attack type.

The method may further include extracting an interest point based on the learning statistical information expressed as bits.

The extracting the interest point may include at least one of selecting at least one partial specific bit stream in the bit stream in the data field as the interest point and selecting the interest point in units of bits based on variation of units of bits in the bit stream in the data field over time.

A bit stream or a bit selected as the interest point may be input to the configured neural network.

If the partial specific bit stream is selected as the interest point, the interest point may include at least one of a bit stream expressing mode information and a bit stream expressing number information.

The variation of units of bits may be calculated by an exclusive-OR operation of units of bits on data field regions of two consecutive CAN packets.

According to another form, a method for detecting attack on vehicle controller area network (CAN) communication includes: generating and storing learning statistical information expressed as bits upon receiving a predefined CAN packet, by extracting a bit stream of the predefined CAN packet matching a template region configured in units of fields constituting a CAN data frame, and extracting a bit stream matching the template region from a real-time input CAN packet, configuring a neural network using the generated learning statistical information for the template region, inputting the extracted bit stream to the configured neural network, and determining whether attack is detected, based on an output value of the neural network.

In still another form, a computer-readable recording medium is provided, which records a program for executing the method for detecting vehicle controller area network (CAN) communication attack.

The above aspects of the present disclosure are merely some parts of the forms of the present disclosure and various forms into which the technical features of the present disclosure are incorporated can be derived and understood by persons skilled in the art from the following detailed description of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
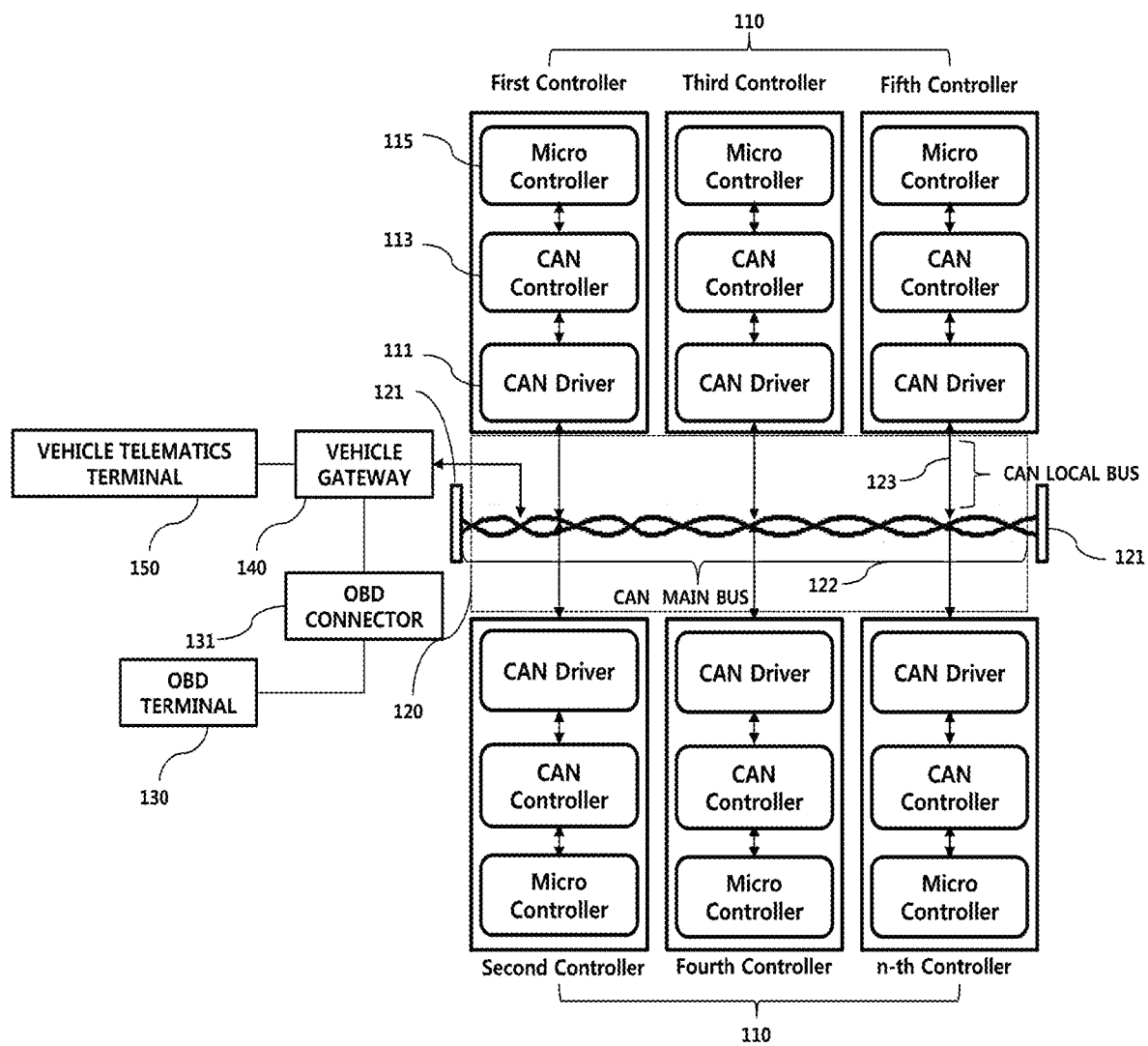
FIG. 1 is a diagram illustrating the structure of a vehicle CAN communication network.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, the suffixes "module" and "unit" of elements herein are used for convenience of description and thus can be used interchangeably and do not have any distinguishable meanings or functions.

Although elements of the present disclosure are described as being integrated into a single one or operated as a single one, the present disclosure is not necessarily limited to such forms. The elements may be selectively integrated into one or more and be operated as one or more according to the present disclosure. Each of the elements, in one form, may be implemented as independent hardware. In another form, some or all of the elements may be selectively combined into a computer program having a program module performing some or all functions combined in one or more pieces of hardware. Code and code segments constituting the computer program may be easily reasoned by those skilled in the art to which the present disclosure pertains. The computer program may be stored in computer readable media such that the computer program is read and executed by a computer to implement forms of the present disclosure. Computer program storage media may include magnetic recording media, optical recording media, and carrier wave media.

The term "comprises", "includes", or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings in the related art from the context. Unless obviously defined in the present disclosure, such terms are not interpreted as having ideal or excessively formal meanings.

Additionally, in describing the components of the present disclosure, terms like first, second, A, B, (a), and (b) are used. These are solely for the purpose of differentiating one component from another, and one of ordinary skill would understand that the terms do not imply or suggest the substances, order or sequence of the components. If a component is described as "connected", "coupled", or "linked" to another component, one of ordinary skill in the art would understand that the components are not necessarily directly "connected", "coupled", or "linked" but also are indirectly "connected", "coupled", or "linked" via a third component.

FIG. 1 is a diagram illustrating the structure of a vehicle CAN communication network according to the present disclosure.

Referring to FIG. 1, a CAN communication system broadly includes at least one vehicle gateway 140, first to n-th controllers 110, a CAN bus 120, an on-board diagnostics (OBD) terminal 130, an OBD connector 131, and a vehicle telematics terminal 150.

Generally, on a CAN bus, there is no master for controlling all nodes when each node (e.g., an electric control unit (ECU)) accesses the CAN bus to read or write data flowing into the CAN bus. Therefore, if each node is ready to transmit data, the node checks on the bus whether the node prepares for transmission and transmits a CAN frame to a CAN. The transmitted CAN frame does not contain address information about a transmission node and a reception node. Instead, each node receives data by distinguishing between CAN frames through unique IDs included in the CAN frames.

The vehicle gateway 140 may determine whether corresponding controllers are stable controllers through an authentication procedure for the controllers 110 connected over the CAN. The vehicle gateway 140 may be connected by wire or wirelessly to the vehicle telematics terminal 150 and the OBD terminal 130. As an example, a user may connect the OBD terminal 130 to the OBD connector 131 to identify, through a screen of the OBD terminal 130, state information of the controllers 110 connected to a CAN main bus 122 or monitor various control signals transmitted and received through the CAN main bus 122. The user may also check, through the OBD terminal 130, vehicle state information collected by the controllers 110. In this case, the state information of the controllers 110, the control signals on the CAN main bus 122, and the vehicle state information collected by the controllers 110 may be transmitted to the OBD terminal 130 through the vehicle gateway 140.

As another example, the OBD connector 131 may be directly connected to the CAN main bus 122. In this case, the OBD terminal 130 may monitor signals transmitted and received directly on the CAN main bus 122 or acquire the state information of the controllers 110 and vehicle state information from the controllers 110 through a predetermined control command, without passing through the vehicle gateway 140.

In addition, the vehicle gateway 140 may collect version information of software installed in controllers, i.e., ECUs, mounted in a vehicle from the OBD terminal 130 according to a predetermined control signal and transmit the collected software version information to the OBD terminal 130. The vehicle gateway 140 may receive a software file for a corresponding controller from the OBD terminal 130 according to a predetermined software update request signal of the OBD terminal 130 and then install the software file in the controller.

The CAN main bus 122 uses twisted pair wires which are driven by different signals (CAN_HI and CAN_LO). Terminal resistors 121 may be installed at both ends of the CAN main bus 122. A transmission speed of the CAN main bus 122 may vary with the length of the bus, i.e., the length of a main BUS line.

The first to N-th controllers 110 may be connected to a CAN joint connector or a CAN hub (not shown) on the CAN main bus 122 through a CAN local bus 123. Theoretically, the maximum number of controllers that can be connected to one CAN is 2032. A plurality of controllers may be connected to one CAN hub through the CAN local bus 123.

Hereinafter, the structure of the controllers 110 connected to a general CAN main bus will be described with reference to reference numerals 110 to 115.

Each of the controllers 110 may include a CAN driver 111, a CAN controller 113, and a microcontroller 115.

The CAN driver 111 is connected to the CAN main bus 122 through the CAN local bus 123 and the CAN connector or CAN hub (nor shown) and constitutes a physical layer of each controller. The CAN driver 111 may provide a function of sensing and managing an obstacle of the CAN main bus 122 and a function of transmitting and receiving messages.

The CAN controller 113 transmits and receives a CAN protocol message and performs a message filtering function of the received message. In one form, the CAN controller 113 may provide a function of buffering messages for retransmission and interfacing with the microcontroller 115.

The microcontroller 115 may include a central processing unit (CPU) therein and provide a higher layer protocol and various applications.

Although not shown in FIG. 1, the controllers 110 may include a memory in which priority information, installed software version information, sensing information, etc. are stored.

The controllers 110 connected to the CAN main bus 122 may transmit control signals and data through a CAN frame defined in standards.

The structure of the CAN frame will be described in detail with reference to FIG. 2 described below.

Figure 2:
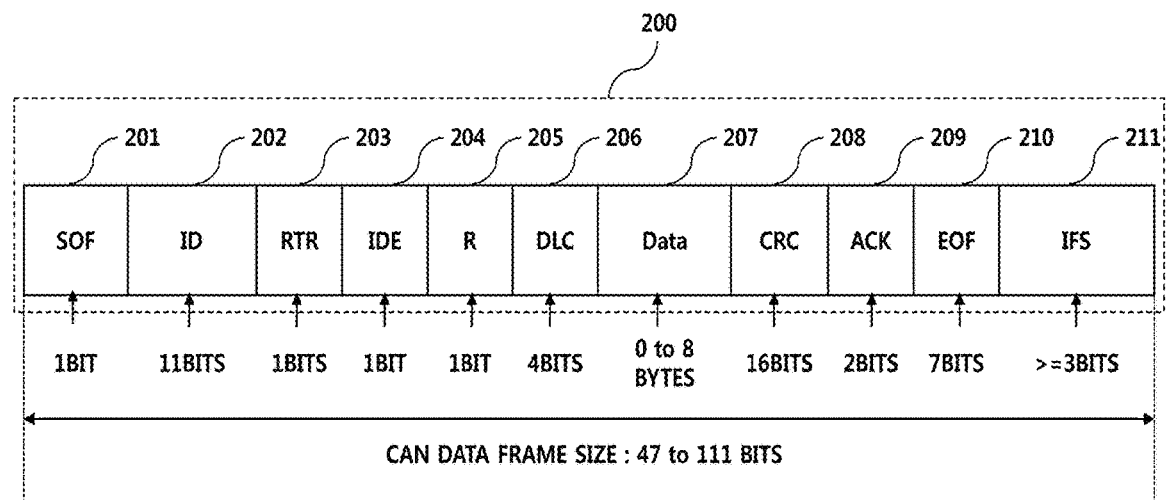
FIG. 2 illustrates the structure of a CAN data frame defined in international standards.

FIG. 2 illustrates the structure of a CAN data frame defined in international standards.

Referring to FIG. 2, a CAN data frame 200 may include a start-of-frame (SOF) field 201, an identifier (ID) field 202, a remote transmission request (RTR) field 203, an identifier extension (IDE) field 204, a reserved (R) field 205, a data length code (DLC) field 206, a Data field 207, a cyclic redundancy check (CRC) field 208, an acknowledgement (ACK) field 209, an end-of-frame (EOF) field 210, and an interframe space (IFS) field 211.

The SOF field 201 has a length of 1 bit and is used to indicate the start of a corresponding frame.

The ID field 202 indicates information for identifying a type of a message and designating priority of a message. In this example, while a standard CAN data frame format in which the ID field 202 has a length of 11 bits is illustrated, the standard format also defines an extended CAN data frame in which the ID field 202 has a length of 29 bits.

The IDE field 204 is used to identify whether a corresponding frame is a standard frame or an extended frame and has a length of 1 bit. For example, if the value of the IDE field 203 is 0, this may indicate the standard frame, and if the value of the IDE field 203 is 1, this may indicate the extended frame.

The RTR field 203 is used to discern whether a corresponding frame is a remote frame or a data frame. For example, if the value of the RTR field 203 is 0, this may indicate the data frame and, if the value of the RTR field is 1, this may indicate the remote frame.

The R field 205 is a reserved field for future use, usage of which is not defined in current standards.

The DLC field 206 indicates code information for identifying the length of data included in a corresponding frame in units of bytes and has a length of 4 bits.

The Data field 207 may have a variable length from 0 bytes to 8 bytes.

The CRC field 208 includes a 15-bit periodic redundancy check code and a 1-bit reverse delimiter and is used to check whether a received frame has an error.

The ACK field 209 is a field for checking whether a receiver has normally received a corresponding frame and has a length of 2 bits. All CAN controllers that have accurately received a CAN data frame transmit an ACK bit at the end of the frame. A transmission node checks whether the ACK bit is present on a bus and, if no ACK is found, the transmission node attempts to retransmit the corresponding frame.

The EOF field 201 is used to indicate the end of a corresponding CAN frame and has a length of 7 bits.

The IFS 211 may be used to indicate a time desired by the CAN controller to process consecutive frames and provide a time desired to shift an accurately received frame to a proper location in a message buffer region.

As described above, the CAN data frame has a variable length from 47 bits to 111 bits. If the size of the Data field 207 is 8 bytes, the ratio of the Data field 207 to the entire CAN data frame corresponds to 58%.

A CAN communication message is provided in various frame formats such as a data frame, a remote frame, and an error frame.

Figure 3:
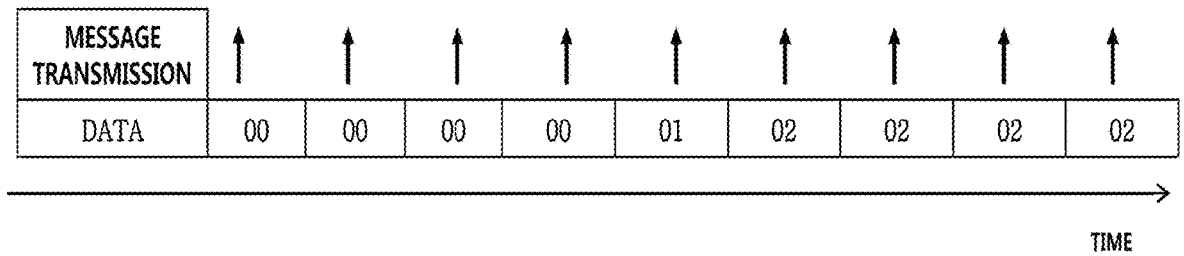
FIGS. 3 and 4 are diagrams illustrating a transmission scheme used for CAN communication.
Figure 4:
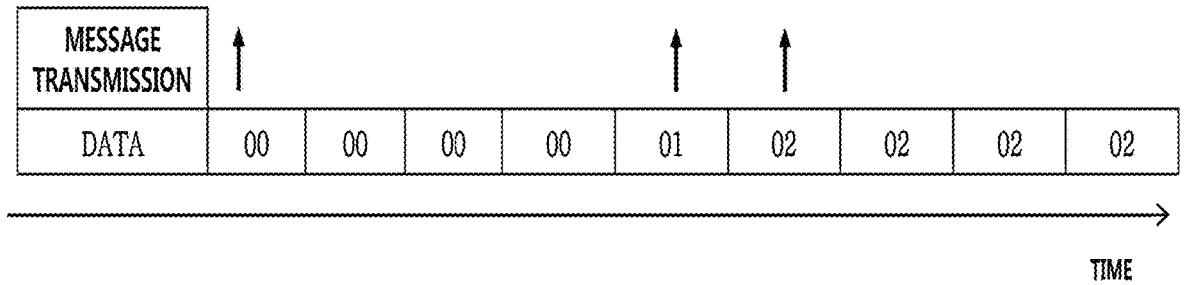

FIGS. 3 and 4 are diagrams illustrating a transmission scheme used for CAN communication according to one form of the present disclosure.

Specifically, FIG. 3 is a diagram illustrating a periodic transmission mode in which a specific transmission node transmits a message at a predetermined period and FIG. 4 is a diagram illustrating an event transmission mode in which a message is transmitted only when data to be transmitted is changed.

Referring to FIG. 3, the transmission node periodically generates a message (i.e., a CAN data frame) at a predefined time interval and transmits the message to a CAN. In this case, in a periodic transmission mode, whether data included in the transmission message is changed may not be checked.

Especially, a periodic CAN data frame transmitted in the periodic transmission mode may be used as a Keep Alive frame for a reception node to confirm whether the transmission node normally operates.

Referring to FIG. 4, in the event transmission mode, the transmission node compares transmission target data with previously transmitted data. If the transmission target data is different from the previously transmitted data, the transmission node configures the transmission target data as a CAN data frame and transmits the transmission target data configured as the CAN data frame to a CAN bus.

The event transmission mode is advantageous in that CAN communication overhead can be reduced because the same data is not unnecessarily transmitted.

Figure 5:
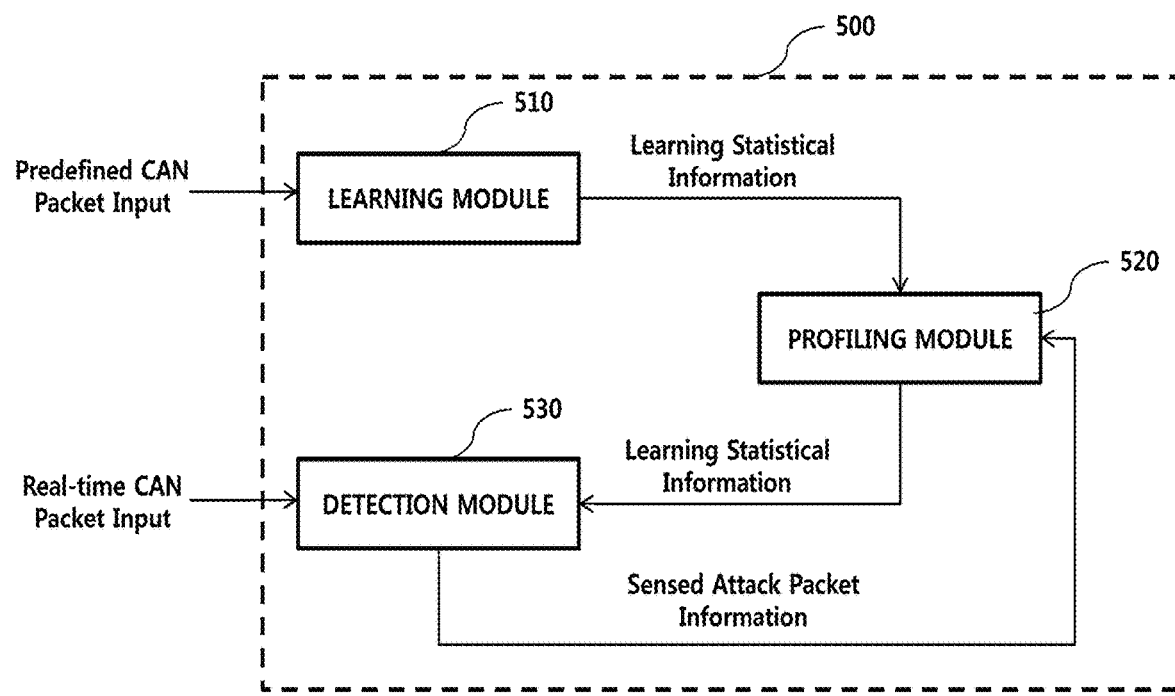
FIG. 5 is a block diagram illustrating the structure of a CAN attack detection device.

FIG. 5 is a block diagram illustrating the structure of a CAN attack detection device according to one form of the present disclosure.

Referring to FIG. 5, a CAN attack detection device 500 may include a learning module 510, a profiling module 520, and a detection module 530.

The learning module 510 may generate learning statistical information expressed as bits by analyzing a predefined CAN packet of a normal state and a CAN packet of an abnormal state and transmit the generated learning statistical information to the profiling module 520.

For example, the learning module 510 may generate learning statistical information per CAN ID. As another example, the learning module 510 may generate learning statistical information of a bit stream of a field included in a predefined template region. The template region may be configured by combining at least one field among the fields except for the Data field 207 in the CAN data frame 200 of FIG. 2. However, the template region is not limited thereto and the Data field 207 may also be included in the template region. As an example, the template region may be configured by, but is not limited to, the ID field 202 and the DLC field 206.

If the learning statistical information about the template region is not generated in the learning module 510, the detection module 520, which will be described later, may confirm only validity of a field value included in the template region by referring to a preset field table. In this case, since only validity of an individual field value is confirmed, validity of a combination of fields (e.g., a combination of the ID field 202 and the DLC field 206) cannot be confirmed. Accordingly, generating the learning statistical information about the template region and confirming validity of a bit stream of the template region based on the learning statistical information have an advantage of detecting sophisticated hacking attempts. Meanwhile, the validity confirmation method performed in units of fields is advantageous in that a calculation time for generating the learning statistical information of the learning module 510 is remarkably reduced.

The learning statistical information may be generated only with respect to the Data field 207 of the CAN data frame 200 but is not limited thereto. According to another form, the learning statistical information may be generated with respect to both the above-described template region and the Data field 207.

The learning statistical information generated by the learning module 510 and information about a precollected attack type may be maintained in the profiling module 520.

In this case, the attack type may be dynamically updated according to an attack detection result detected by the detection module 530. For example, the information about the attack type may be a list of CAN packets determined as attack packets but is not limited thereto.

As an example, if a real-time input CAN packet is determined as an attack packet, the detection module 530 may transmit information about the attack packet to the profiling module 520.

Upon receiving a CAN packet, the detection module 530 may extract a CAN ID from the CAN packet and acquire learning statistical information corresponding to the extracted CAN ID from the profiling module 520.

Next, the detection module 530 may configure a neural network for machine learning using the acquired learning statistical information, extract a bit stream of a data field from the input CAN packet, and input the extracted bit stream to the neural network. The detection module 530 may judge whether the CAN packet is an attack packet, based on an output value of the neural network.

Accordingly, the learning statistical information may include, but is not limited to, various parameters desired to configure the neural network, for example, a weight parameter optimized between a layer and a node described later, the number of hidden layers, and the like.

Figure 6:
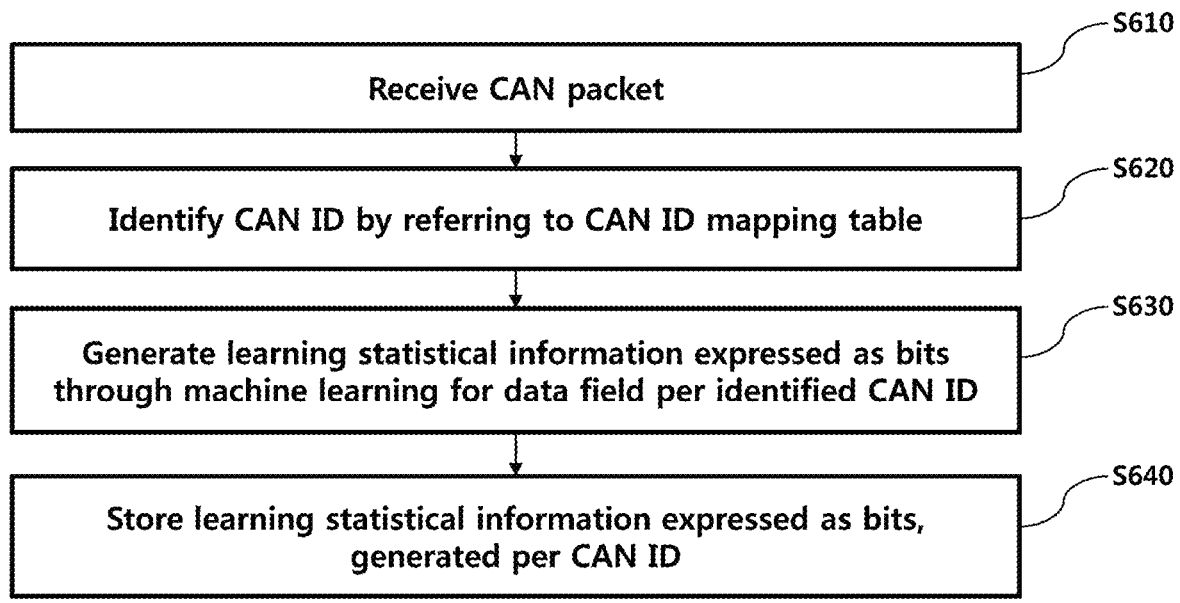
FIG. 6 is a flowchart illustrating a learning statistical information generation procedure in a CAN attack detection device.

FIG. 6 is a flowchart illustrating a learning statistical information generation procedure in a CAN attack detection device.

Referring to FIG. 6, upon receiving a CAN packet, the CAN attack detection device may identify a CAN ID by referring to a preconfigured CAN ID mapping table (S610 and S620).

The CAN attack detection device may generate learning statistical information expressed as bits through machine learning for a data field per identified CAN ID (S630). In this case, machine learning may include, but is not limited to, a neural network.

Next, the CAN attack detection device may store the learning statistical information expressed as bits, generated per CAN ID (S640). The learning statistical information may be maintained in the profiling module 520 of FIG. 5.

Figure 7:
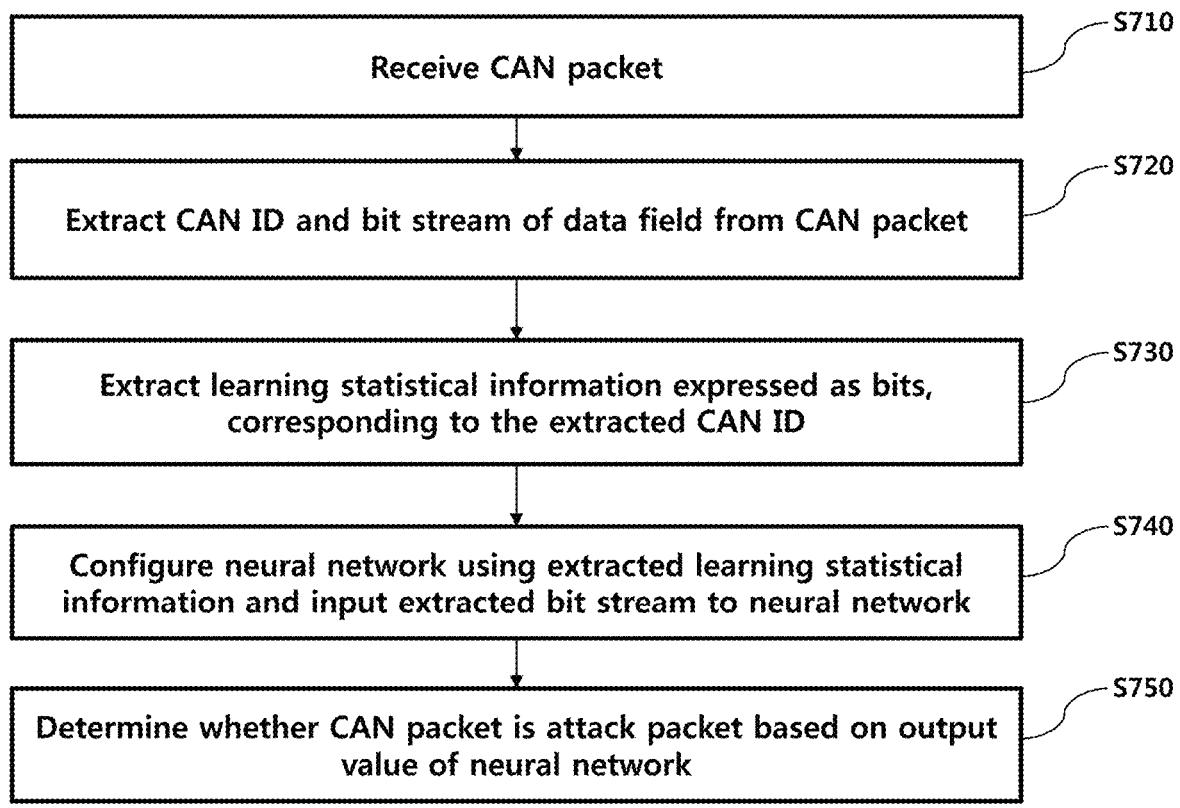
FIG. 7 is a flowchart illustrating a CAN attack detection method in a CAN attack detection device.

FIG. 7 is a flowchart illustrating a CAN attack detection method in a CAN attack detection device.

Referring to FIG. 7, upon receiving a CAN packet, the CAN attack detection device may extract a CAN ID and a bit stream of a data field from the CAN packet (S710 and S720).

The CAN attack detection device may extract learning statistical information expressed as bits, corresponding to the extracted CAN ID (S730).

Next, the CAN attack detection device may configure a neural network using the extracted learning statistical information and input the extracted bit stream to the neural network (S740).

The CAN attack detection device may determine whether the CAN packet is an attack packet based on an output value of the neural network (S750). For example, the output value of the neural network may be 0 or 1. The output value of 1 indicates a normal packet and the output value of 0 may indicate an attack packet.

Figure 8:
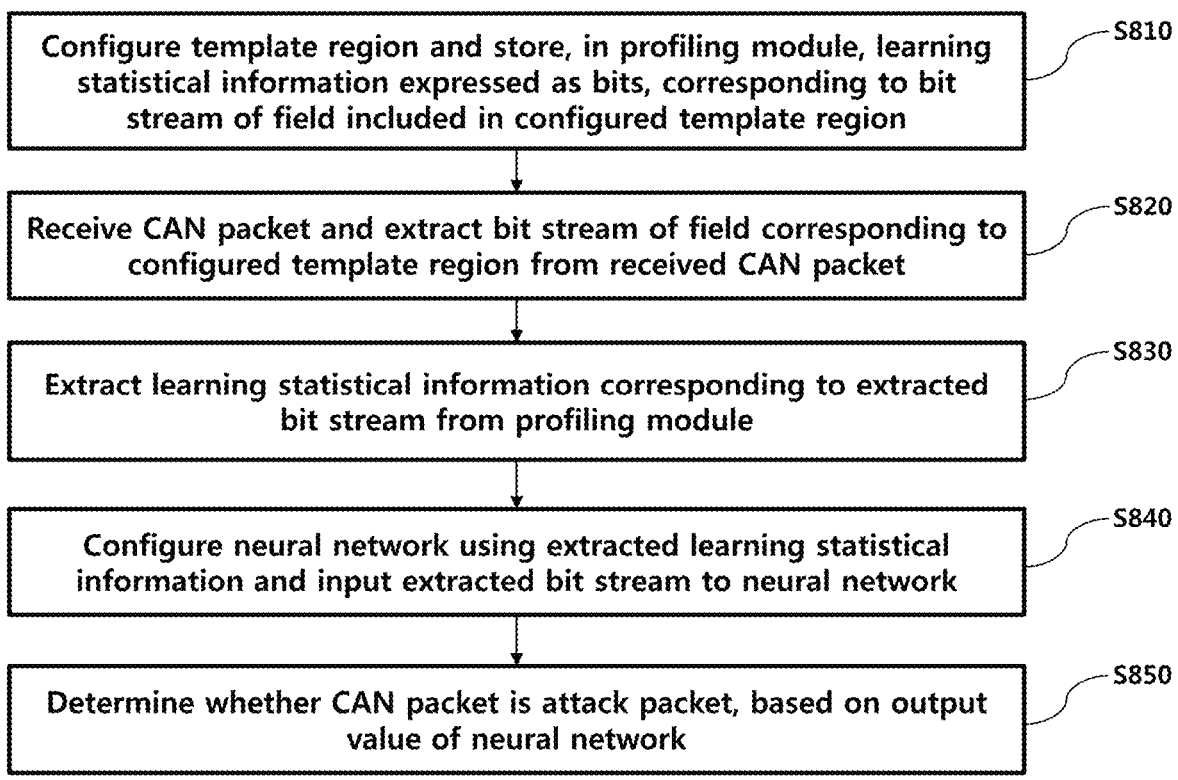
FIG. 8 is a flowchart illustrating a CAN attack detection method in a CAN attack detection device.

FIG. 8 is a flowchart illustrating a CAN attack detection method in a CAN attack detection device according to another form.

Referring to FIG. 8, the CAN attack detection device may configure a predetermined template region and store, in a predetermined recording region, learning statistical information expressed as bits, corresponding to a bit stream of a field included in the configured template region (S810). The recording region may be the profiling module 520 of FIG. 5. The CAN attack detection device may configure a plurality of template regions and generate learning statistical information expressed as bits for each configured template region. The generated learning statistical information may be maintained in the profiling module 520. For example, a first template region may be configured only by the ID field 202 and a second template region may be configured by the ID field 202 and the DLC field 206. However, the template regions are not limited thereto and may be configured by combining at least one field included in the CAN data frame 200.

Upon receiving a CAN packet, the CAN attack detection device may extract a bit stream of a field corresponding to the configured template region from the received CAN packet and extract learning statistical information corresponding to the extracted bit stream (i.e., the corresponding template region) from a corresponding recording region (S820 to S830).

The CAN attack detection device may configure a neural network using the extracted learning statistical information and input the extracted bit stream to the neural network (S840).

Next, the CAN attack detection device may determine whether the CAN packet is an attack packet, based on an output value of the neural network (S850).

Figure 9:
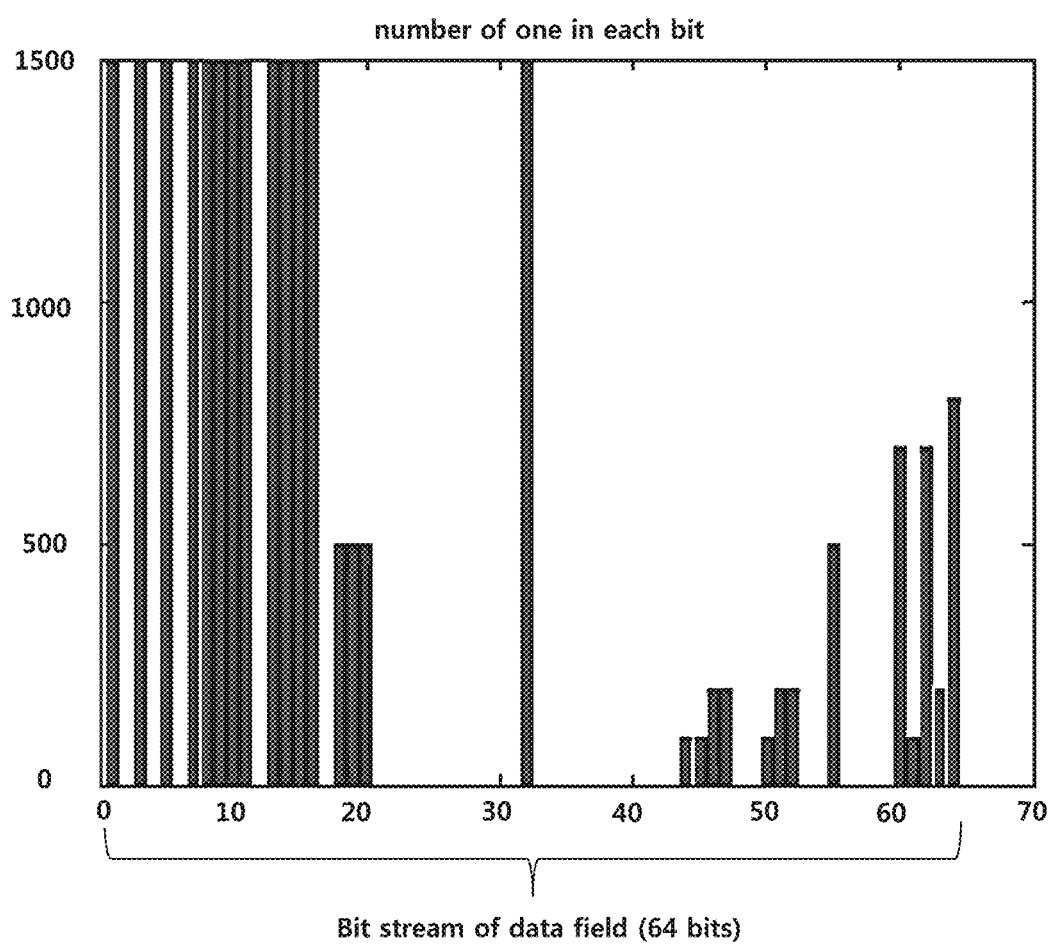
FIG. 9 is a diagram illustrating an interest point extraction method of a data field of a CAN packet configured by probability statistics in bits.

FIG. 9 is a diagram illustrating an interest point extraction method of a data field of a CAN packet configured by probability statistics in bits.

To extract interest points for expressing a statistical characteristic of a normal state/hacking state from an input CAN packet, direct statistical characteristics may be extracted in units of bits constituting the CAN packet. Compared with a conventional scheme of decoding a packet to restore and interpret an original digital signal and extracting statistical characteristics from the digital signal, a scheme of extracting direct statistical characteristics from the bit stream need not perform decoding and thus reduces the amount of calculations by a controller. A typical example of extracting the statistical characteristics from the input CAN packet includes a blind scheme.

The blind scheme may use information of each input bit in a binary stream of the CAN packet as interest points. For example, if a data field of a CAN data frame of a total of 64 bits is input, the blind scheme may use a group of 64 interest points. That is, as illustrated in FIG. 9, a bit stream of a data field configured by 8 bytes (8*8=64 bits) may be configured by a group of 64 interest points (bits). In this case, statistical information about the probability of generating symbol '1' with respect to each interest point (bit) or the number of times of generating symbol '1' with respect to each interest point (bit) is generated and statistical data collected with respect to each interest point may be used as a criterion for checking whether attack is generated. Since the blind scheme may be independently applied to a syntax of a packet, the blind scheme has an advantage of being performed without manual input of a user in a learning and hacking recognition procedure.

Figure 10:
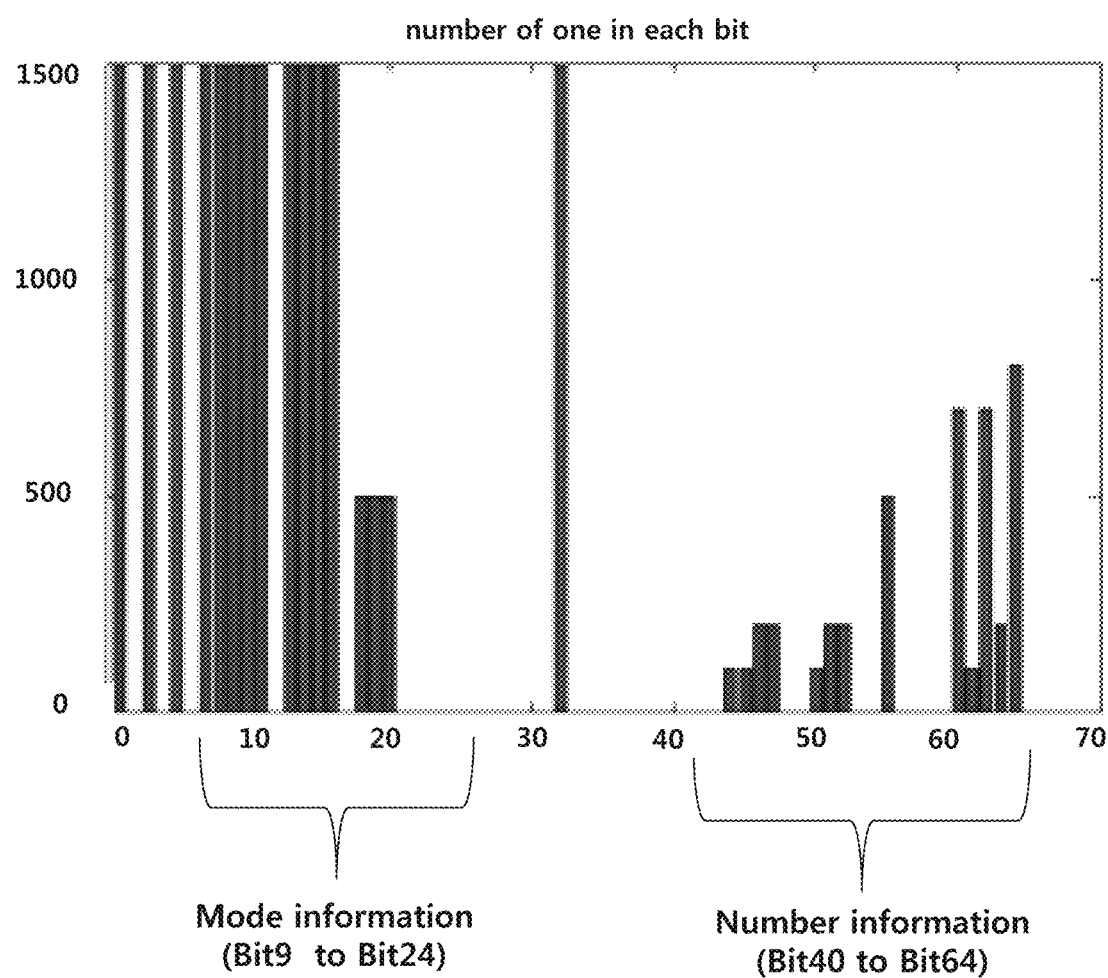
FIG. 10 is a diagram illustrating an interest point extraction method of a data field of a CAN packet configured by probability statistics in bits.

FIG. 10 is a diagram illustrating an interest point extraction method of a data field of a CAN packet configured by probability statistics in bits.

Unlike the above-described blind scheme of FIG. 9, a bit-of-interest (BoI) scheme configures interest points by selecting a specific bit stream based on syntax information of a bit stream for a corresponding field. For example, information included a data field of a CAN data frame may broadly include mode information and number information. The mode information may be recorded in a bit stream indicating the state of an ECU or some devices, such as close/open of a window or ON/OFF of a headlight. On the other hand, the number information may be recorded in a bit stream indicating a state value of a specific device, such as RPM speed, fuel amount, and wheel angle. In the BoI scheme, only the mode information and number information may be selected and used as interest points for learning. As an example of the BoI scheme as illustrated in FIG. 10, when the 9th to 24th bits in a bit stream of a data field correspond to the mode information and the 40th to 64th bits correspond to the number information, only bit streams allocated to the mode information and the number information may be used as the interest points.

Generally, if the mode information is activated, the number information may not be activated and, if the number information is activated, the mode information may not be activated. Therefore, maintaining learning statistical information of a specific bit stream in a corresponding field and comparing the specific bit stream with an input bit stream to determine whether attack occurs may be effective in terms of calculation speed and memory use.

As another example, an interest point extraction scheme based on variation of a bit stream over time may be applied.

For example, variation of a bit stream recorded in a data field of an input CAN data frame over time may be calculated by Equation (1) indicated below.

$$dP(T)=P(T)\otimes P(T-1) \quad \text{Equation (1)}$$

where $\otimes$ is defined as a component-wise exclusive OR (CEO) operator.

That is, a time-varying interest point may be extracted by performing an exclusive-OR operation on bit streams input at time T and time T-1 in units of bits.

For example, a bit having a value of 1 as a result of performing an exclusive OR operation on a bit stream at time T and a bit stream at time T-1 may be determined as an interest point.

Accordingly, statistical information learned with respect to a time-varying interest point has an advantage of effectively detecting attack for event (terminal) attack or periodic packet sniffing.

Hereinafter, a neural network learning method used as a machine learning method will be described in detail with reference to FIG. 11.

Figure 11:
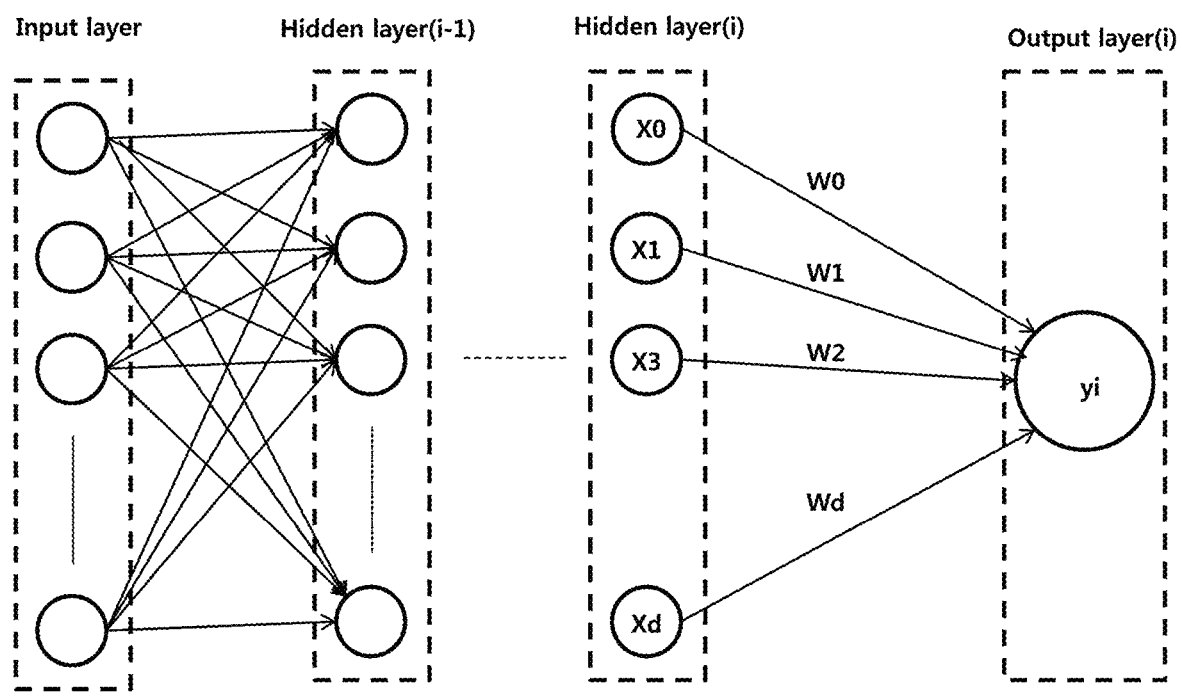
FIG. 11 is a diagram illustrating a procedure of detecting attack based on learning statistical information generated through neural network learning.

FIG. 11 is a diagram illustrating a procedure of detecting attack based on learning statistical information generated through neural network learning.

Referring to FIG. 11, a bit stream which is input from an input layer in a neural network may be transmitted to an output layer via at least one hidden layer. As an example, referring to FIG. 11, a final output value $y^i$ (i.e., "yi" in FIG. 11) calculated by a nonlinear combination of output values of a hidden layer (i) (e.g., X0 to Xd) may be calculated by Equation (2) indicated below.

$$y^i = \sigma(w_{0m} + w_m x^i), m=1 \ldots, M \quad \text{Equation (2)}$$

where $\sigma( )$ denotes a sigmoid function which is called an activation function and may have output values of 0 and 1, w denotes a weight parameter of a connection line between nodes, and M denotes the total number of nodes in each layer. An output value of each layer is used as an input value of the next layer.

Since the neural network learning scheme is a supervised learning scheme, whether a packet used in a learning process is a hacking packet is preknown. That is, a value y of a final output node of each packet may be 0 or 1. The parameter w of each layer in the neural network may be learned in the form of reducing an error of the final node. In this case, an optimal value of the parameter w of each layer may be determined through repeated learning of several times. The parameter of each layer may be maintained in the profiling module by being included in the learning statistical information.

Forms of the present disclosure may have the following effects.

The present disclosure may advantageously provide an in-vehicle network attack detection method and apparatus.

The present disclosure may also advantageously provide a method for adaptively detecting attack based on a statistical characteristic of a prelearned CAN packet and an apparatus therefor.

In addition, the present disclosure may advantageously reduce the amount of calculation for attack detection in a controller by adaptively detecting attack in consideration of only a statistical characteristic of binary data without decoding a CAN communication packet.

The present disclosure further may advantageously reduce manual input by a user in a learning procedure by reducing consideration of a syntax of a CAN frame because a statistical characteristic of an input CAN communication packet is extracted through learning in units of bits.

It will be appreciated by persons skilled in the art that that the effects that can be achieved through the present disclosure are not limited to what has been particularly described hereinabove and other advantages of the present disclosure will be more clearly understood from the above detailed description.

Those skilled in the art will appreciate that the present disclosure may be embodied in other specific forms than those set forth herein without departing from the spirit and characteristics of the present disclosure.

The scope of the present disclosure should be determined by reasonable interpretation of the appended claims and all changes coming within the equivalency range of the present disclosure are intended to be embraced in the scope of the present disclosure.

What is claimed is:

1. A controller area network (CAN) attack detection apparatus connected to a CAN bus for in-vehicle communication, the apparatus comprising:
   a CAN driver including a first microprocessor and configured to:
      sense and manage an obstacle of the CAN bus;
      transmit a physical message to the CAN bus; and
      receive the physical message from the CAN bus;
   a CAN controller including a second microprocessor and configured to:
      transmit a protocol message to the CAN driver; and
      receive the protocol message from the CAN driver;
   a microcontroller including a third microprocessor and configured to:
      interface with the CAN controller; and
      provide various applications;
   wherein at least one of the microcontroller or the CAN controller is configured to execute:
      a learning module configured to identify a CAN identifier (ID) upon receiving a predefined CAN packet and to generate learning statistical information expressed as bits with respect to a data field corresponding to the identified CAN ID;
      a profiling module configured to maintain the learning statistical information received from the learning module and a precollected attack type; and
      a detection module configured to:
         extract a CAN ID and a bit stream of a data field from a real-time input CAN packet, and
         determine a weight parameter of a connection line between nodes of a neural network using the learning statistical information acquired from the profiling module,
         input the extracted bit stream to an input layer of the neural network, and
         determine whether an attack is detected, based on an output value from an output layer of the neural network,
      wherein the output value from the output layer is calculated by a nonlinear combination of an output value of at least one hidden layer of the neural network.

2. The apparatus according to claim 1, wherein the detection module is configured to transmit the real-time input CAN packet to the profiling module upon determining that the attack is detected according to the output value from the output layer, and the profiling module is configured to update the precollected attack type using a CAN packet detected as an attack packet.

3. The apparatus according to claim 1, wherein the detection module determines whether the attack is detected by determining whether the real-time input CAN packet is a CAN packet corresponding to the precollected attack type.

4. The apparatus according to claim 1, wherein the learning module is configured to extract an interest point based on the learning statistical information expressed as the bits.

5. The apparatus according to claim 4, wherein the learning module is configured to select at least one partial specific bit stream in the bit stream of the data field as the interest point.

6. The apparatus according to claim 5, wherein the detection module is configured to input a bit stream corresponding to the selected interest point to the neural network.

7. The apparatus according to claim 5, wherein the interest point includes at least one of a bit stream expressing mode information and a bit stream expressing number information.

8. The apparatus according to claim 4, wherein the learning module is configured to select the interest point in units of bits based on variation of units of bits in the bit stream of the data field over time.

9. The apparatus according to claim 8, wherein the variation of units of bits is calculated by an exclusive-OR operation on data field regions of two consecutive CAN packets.

10. The apparatus according to claim 1, wherein the predefined CAN packet includes a CAN packet of a normal state and a CAN packet of an abnormal state.

11. A controller area network (CAN) attack detection apparatus connected to a CAN bus for in-vehicle communication, the apparatus comprising:
a CAN driver including a first microprocessor and configured to:
sense and manage an obstacle of the CAN bus;
transmit a physical message to the CAN bus; and
receive the physical message from the CAN bus;
a CAN controller including a second microprocessor and configured to:
transmit a protocol message to the CAN driver; and
receive the protocol message from the CAN driver;
a microcontroller including a third microprocessor and configured to:
interface with the CAN controller; and
provide various applications;
wherein at least one of the microcontroller or the CAN controller is configured to execute:
a learning module configured to generate learning statistical information expressed as bits upon receiving a predefined CAN packet, by extracting a bit stream of the predefined CAN packet matching a template region configured in units of fields constituting a CAN data frame;
a profiling module configured to maintain the generated learning statistical information and a precollected attack type; and
a detection module configured to:
extract a bit stream matching the template region from a real-time input CAN packet,
determine a weight parameter of a connection line between nodes of a neural network using the generated learning statistical information for the template region,
input the extracted bit stream to an input layer of the neural network, and
determine whether an attack is detected, based on an output value from an output layer of the neural network,
wherein the output value from the output layer is calculated by a nonlinear combination of an output value of at least one hidden layer of the neural network.

12. A method for detecting an attack on a controller area network (CAN) by a CAN attack detection apparatus connected to a CAN bus for in-vehicle communication, the method comprising:
sensing and managing, by a CAN driver, an obstacle of the CAN bus;
transmitting, by the CAN driver, a physical message to the CAN bus;
receiving, by the CAN driver, the physical message from the CAN bus;
transmitting, by a CAN controller, a protocol message to the CAN driver;
receiving, by the CAN controller, the protocol message from the CAN driver;
interfacing, by a microcontroller, with the CAN controller and providing various applications;
identifying, by at least one of the microcontroller or the CAN controller, a CAN identifier (ID) upon receiving a predefined CAN packet and generating and storing learning statistical information expressed as bits with respect to a data field corresponding to the identified CAN ID;
extracting, by at least one of the microcontroller or the CAN controller of a vehicle, a CAN ID and a bit stream of a data field from a real-time input CAN packet;
determining, by at least one of the microcontroller or the CAN controller of a vehicle, a weight parameter of a connection line between nodes of a neural network based on the learning statistical information corresponding to the extracted CAN ID;
inputting, by at least one of the microcontroller or the CAN controller of a vehicle, the extracted bit stream to an input layer of the neural network; and
determining whether an attack is detected, based on an output value from an output layer of the neural network,
wherein the output value from the output layer is calculated by a nonlinear combination of an output value of at least one hidden layer of the neural network.

13. The method according to claim 12, further comprising:
maintaining information about a precollected attack type in a predetermined recording region and, when the attack is determined according to the output value from the output layer, updating the precollected attack type using the real-time input CAN packet.

14. The method according to claim 13, further comprising:
sensing an attack by determining whether the real-time input CAN packet is a CAN packet corresponding to the precollected attack type.

15. The method according to claim 12, further comprising:
extracting an interest point based on the learning statistical information expressed as bits.

16. The method according to claim 15, wherein the extracting the interest point comprises at least one of:
  selecting at least one partial specific bit stream in the bit stream in the data field as the interest point; or
  selecting the interest point in units of bits based on variation of units of bits in the bit stream in the data field over time.

17. The method according to claim 16, wherein a bit stream or a bit selected as the interest point is input to the neural network.

18. The method according to claim 16, wherein, when the partial specific bit stream is selected as the interest point, the interest point includes at least one of a bit stream expressing mode information or a bit stream expressing number information.

19. The method according to claim 16, wherein the variation of units of bits is calculated by an exclusive-OR operation of units of bits on data field regions of two consecutive CAN packets.

20. A method for detecting an attack on a controller area network (CAN) by a CAN attack detection apparatus connected to a CAN bus for in-vehicle communication, the method comprising:
  sensing and managing, by a CAN driver, an obstacle of the CAN bus;
  transmitting, by the CAN driver, a physical message to the CAN bus;
  receiving, by the CAN driver, the physical message from the CAN bus;
  transmitting, by a CAN controller, a protocol message to the CAN driver;
  receiving, by the CAN controller, the protocol message from the CAN driver;
  interfacing, by a microcontroller, with the CAN controller and providing various applications;
  generating and storing, by at least one of the microcontroller or the CAN controller, learning statistical information expressed as bits upon receiving a predefined CAN packet, by extracting a bit stream of the predefined CAN packet matching a template region configured in units of fields constituting a CAN data frame; and
  extracting, by at least one of the microcontroller or a CAN controller of the vehicle, a bit stream matching the template region from a real-time input CAN packet, determining a weight parameter of a connection line between nodes of a neural network using the generated learning statistical information for the template region, inputting the extracted bit stream to an input layer of the neural network, and determining whether an attack is detected, based on an output value from an output layer of the neural network,
  wherein the output value from the output layer is calculated by a nonlinear combination of an output value of at least one hidden layer of the neural network.

* * * * *